Sept. 4, 1928. 1,682,921
O. D. McFARLAND
APPARATUS FOR PRODUCING INDIVIDUAL SHINGLE SIMULATING ELEMENTS
Filed Aug. 6, 1926 9 Sheets-Sheet 4

Sept. 4, 1928.

O. D. McFARLAND

1,682,921

APPARATUS FOR PRODUCING INDIVIDUAL SHINGLE SIMULATING ELEMENTS

Filed Aug. 6, 1926
9 Sheets-Sheet 5

Sept. 4, 1928. 1,682,921
O. D. McFARLAND
APPARATUS FOR PRODUCING INDIVIDUAL SHINGLE SIMULATING ELEMENTS
Filed Aug. 6, 1926 9 Sheets-Sheet 6

Patented Sept. 4, 1928.

1,682,921

UNITED STATES PATENT OFFICE.

OWEN D. McFARLAND, OF CHICAGO, ILLINOIS, ASSIGNOR TO GUYTON & CUMFER MFG. CO., OF CHICAGO, ILLINOIS, A CORPORATION OF ILLINOIS.

APPARATUS FOR PRODUCING INDIVIDUAL SHINGLE-SIMULATING ELEMENTS.

Application filed August 6, 1926. Serial No. 127,680.

This invention relates more particularly to a revolving cylinder cutting machine of a universal type, adapted to act on a continuously advancing flexible sheet of roofing material to produce individual shingle strips or slabs therefrom.

The machine of the present invention is designed to act on said sheet either transversely, longitudinally or diagonally of the sheet, the cutting being done by the design-forming means carried by the cutting cylinder.

Briefly, the machine of the present invention comprises opposed endless conveyors for feeding a continuous strip of roofing material in to the machine, a rotary design-forming cylinder acting on said sheet against a bed roll to produce predetermined designs therein, separating elements for separating adjacent individual strips severed by the design-forming mechanism from each other, separate conveyors for each set of separated individual elements, and separate collecting means.

As one of the features of the present invention, the design-forming cylinder is mounted on a carriage adapted to be moved on a track into and out of engagement with the permanent mechanism of the machine. This arrangement permits design-forming cylinders of different design and size to be substituted one for another on the carriage while disengaged from the main or permanent part of the machine, thus permitting the production of individual shingle elements of any desired design and size merely by substituting for a cylinder previously used a different cylinder of the desired design and size.

As another feature of the invention, since the cutting, punching, slitting, design-forming and similar operations on a continuous sheet are performed under the revolving cutting cylinder, the machine can act on said continuous sheet of material being fed to the cylinder either transversely, longitudinally or diagonally of the sheet, depending upon the design and size of the individual shingle element desired, the proper cylinder being inserted on the movable carriage to produce such design and size. Thus the machine is universal and flexible in its use, merely requiring the substitution of a cutting cylinder of the desired design and size without any other change in the main part of the machine.

As a still further feature of the invention, to permit the continuous strip of roofing material to be initially inserted between the opposed endless conveyors, I have provided means for raising the upper conveyor away from the lower one.

Many advantages and objects of the present invention will be obvious from the foregoing brief description, and will be more particularly brought out in the following description.

However, it may be well to point out more particularly some of the major advantages of the machine of the present invention. Among its main objects are to provide a machine equipped with permanent mechanisms for accomplishing steps in the manufacture of individual shingle elements, which permanent mechanisms may be common to shingle elements of any design or size; to provide in such a machine means for substituting cylinders of the desired design and size without making any changes in the so-called permanent mechanisms of the apparatus; to provide a machine which is universal in its scope, being capable by the use of the proper cutting cylinder of acting on a continuous strip of material either transversely, longitudinally or diagonally relative to said strip; to provide a machine in which the feed of the continuous strip of material is very positive, due to the use of opposed endless conveyors through which the sheet passes; to provide a machine in which separating elements engage the continuous sheet immediately subsequent to leaving the design-forming means, to separate said strip into individual shingle-simulating elements of predetermined design and size, said design and size being regulated by the design and size of the design-forming cylinder used; to provide means for raising the upper endless feed conveyor away from the lower one to initially permit the continuous strip of roofing material to be threaded therethrough, and, in general, to provide a machine which is universal in use, permitting the production of shingle-simulating elements of any desired design and size merely by substituting a cutting cylinder of the desired design and size without interfering with the main part of the machine.

Referring more in detail to the drawings: 1 designates a clutch pulley mounted on shaft 2, bearing, as shown at 3, in the supporting structure 4 of the machine. For the sake of clearness, the numeral 4 will designate the permanent supporting structure and frame of the machine wherever it is shown on the drawings and used in the specification. The shaft 3 has keyed on its opposite end a pinion gear 5 meshing with an enlarged driving gear 6 keyed, as shown at 7, on the bed-roll shaft 8, which latter is journaled in the bearing 9 supported in the supporting structure 4 of the machine. Also keyed on the shaft 8 is an auxiliary gear 10, adapted to mesh with oppositely disposed gears 11 and 12 (Fig. 1), which gears impart drive to the endless feed conveyors and the separating elements, as will be hereinafter more particularly described. Also keyed on shaft 8 (Fig. 4) is a smaller spur gear 13, adapted to mesh with a gear 14 keyed on the end of the cutting cylinder shaft 15. This gear 14 and shaft 15 will be hereinafter more particularly described. The shaft 8 also bears intermediate its length in the bearing 16, and on its other end in the bearing 17, both of which are mounted on the permanent supporting structure 4 of the machine. The shaft 8 carries smooth surface bed roll 18.

Figure 1:
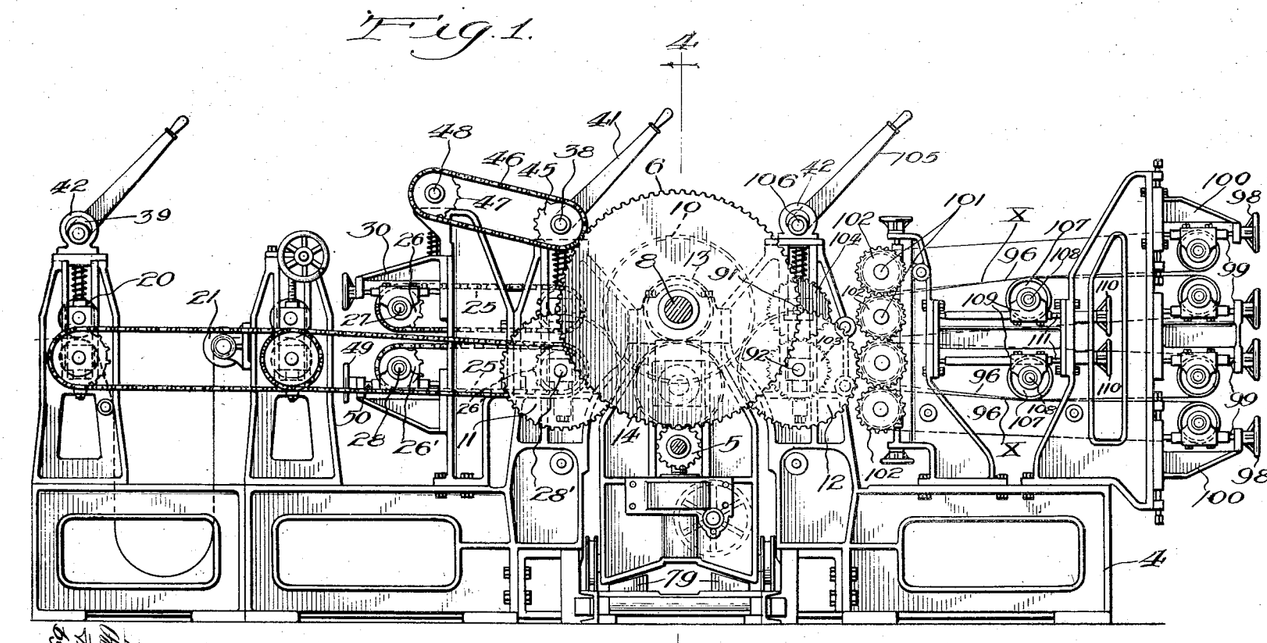
Fig. 1 is a side elevational view.
Figure 2:
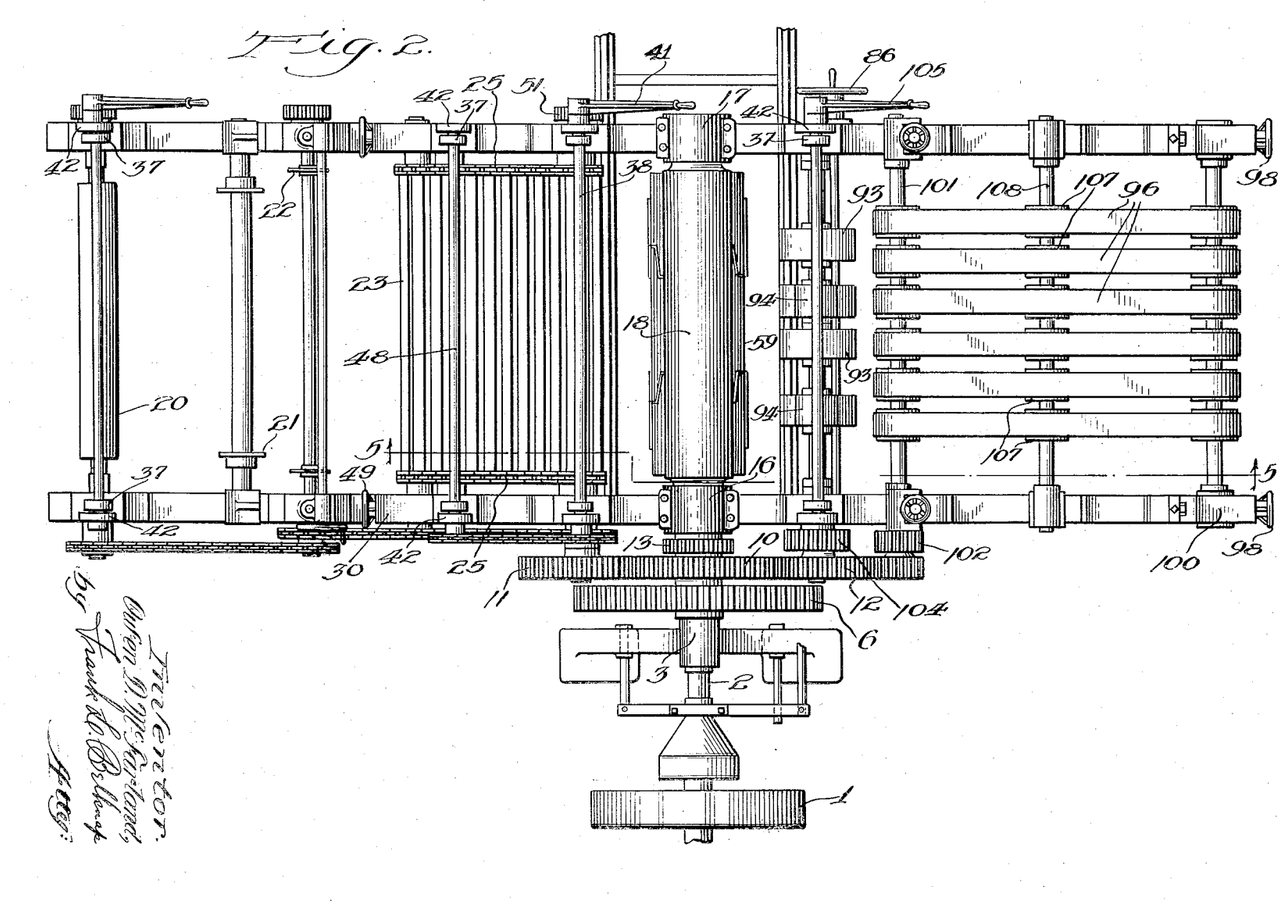
Fig. 2 is a top plan view.
Figure 5:
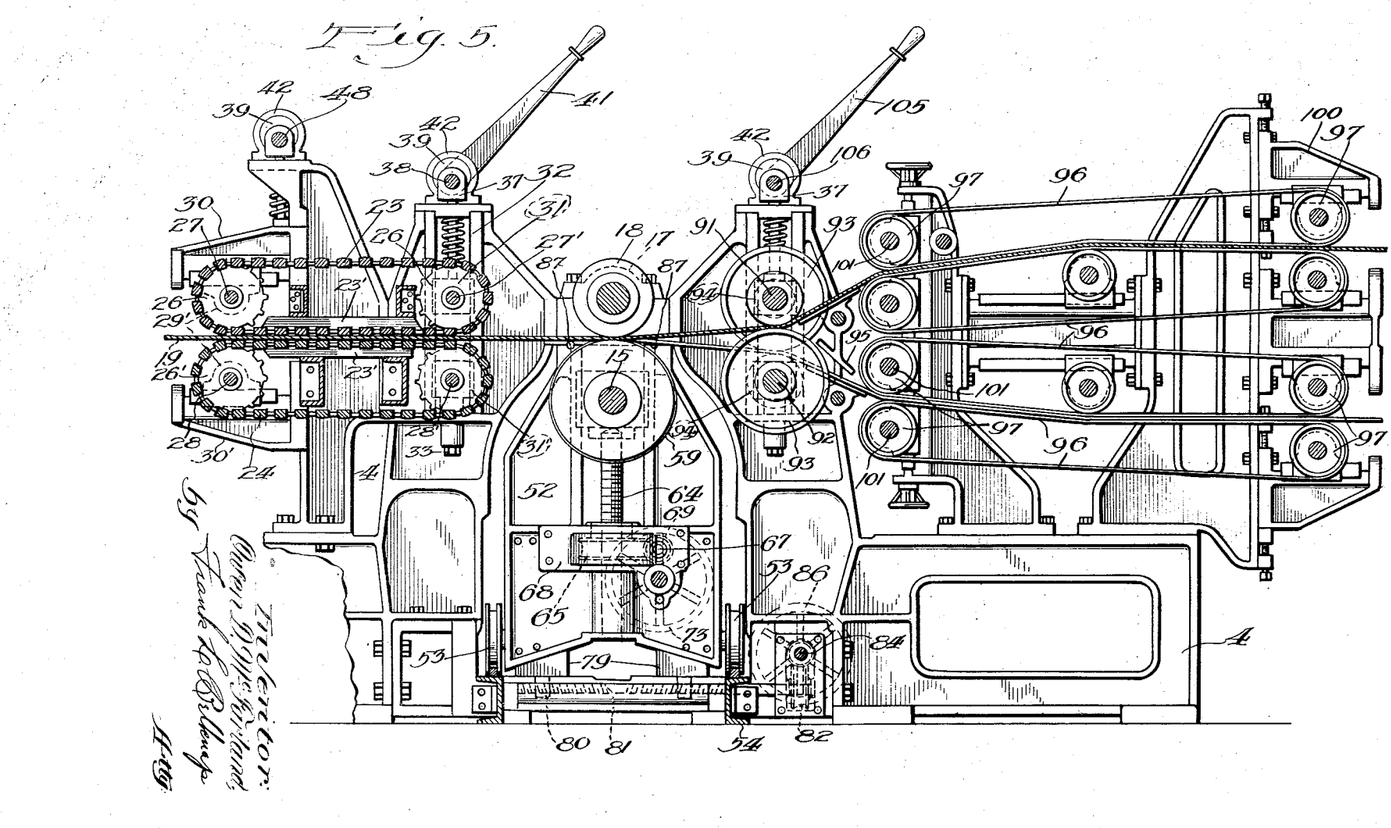
Fig. 5 is an enlarged cross-sectional view taken on line 5—5 of Fig. 2.

Describing now more particularly the means for feeding a continuous strip of material into the machine, and referring more particularly to Figs. 1, 2 and 5, the sheet designated diagrammatically at 19 (Fig. 5) may be guided between the auxiliary draw rolls 20 and guides 21 and, if desired, may have its edges trimmed by means of the edge slitters 22, being fed between opposed endless feed conveyors 23 and 24. These endless feed conveyors 23 and 24 comprise spaced transverse crossbars mounted at both ends on endless chains 25 meshing (Fig. 5) with sprockets 26 and 26', respectively. The upper set of sprockets 26 is carried by the shafts 27 and 27', while the lower set of sprockets 26' is carried by the shafts 28 and 28'. It is understood that there is a sprocket mounted on each end of each shaft, meshing with sprocket chains 25. To prevent sagging of the endless conveyors 23 and 24 and sprocket chains 25 and in order to insure proper guiding of these elements, opposed guide bars 23' (Fig. 5) may be provided. The arrangement is such that opposed shafts 27 and 28 are journaled in bearings 29 and 29', carried by brackets 30 and 30'. The brackets 30 and 30' are mounted on the permanent supporting structure 4 of the machine. Bracket 30' is stationary or fixed relative the supporting structure 4, while bracket 30 is movable upwardly and downwardly for a purpose to be hereinafter explained. Shafts 27' and 28' are mounted in square bearings 31 and 31', which latter are mounted in a slotted guideway 32, the latter forming part of the permanent supporting structure 4. The bearing 31' is stationary, being fixed to the permanent supporting structure 4 by means of the lock bolt 33. The upper square bearing 31, however, is slidable vertically in the slideway 32 for a purpose to be now explained.

When the continuous sheet 19 is initially threaded into the machine, the upper endless feed conveyor 23 must be raised in order to permit the sheet to be threaded between the upper and lower feed conveyors 23 and 24. To provide for this, and referring more particularly to Figs. 14, 15 and 16, studs 34, each surrounded by a coil spring 35 and mounted on opposite sides of the machine, have locking engagement on their lower ends with the square bearings 31 carrying the shafts 27'. The upper end of each stud 34 projects through a cap 36, being permanently attached to a head 37 loosely mounted on shaft 38. Also mounted on both ends of the shaft 38, directly adjacent the outside of heads 37, are eccentrics 39, keyed to the shaft 38. On one end of the shaft 38 beyond the eccentric it is provided with a hand lever 41. Each eccentric rotates in eccentric housing 13

42 attached to the eccentric by means of screws 43 registering with circumferential groove 44 in the eccentric 39. The arrangement is such that by raising the lever 41, each eccentric 39 is rotated in its housing 42, forcing the housing to move in a horizontal plane on the cap 36 and causing the stud 34 to be raised, carrying with it the square bearings 31 and the opposite ends of the endless feed conveyors 23. Sprockets 45 are also mounted on the shaft 38, adapted to mesh with sprocket chains 46 (Fig. 1), which latter also have meshing engagement with oppositely disposed sprockets 47 mounted on the shaft 48. The shaft 48 carries on both ends heads similar to heads 37, eccentrics similar to eccentrics 39, and housings similar to housings 42. A detailed descriptions, therefore, of the operation of shaft 48 with its heads, eccentrics, eccentric housings and studs for simultaneously raising and lowering the ends of the upper conveyor is not thought necessary. It may be explained that the studs 34 below the shaft 45 are fixedly attached to the bracket 30 instead of to the square bearings 31. This is the only difference in operation between these two sets of shafts and mechanisms carried and actuated thereby.

Figures 14, 15, 16:
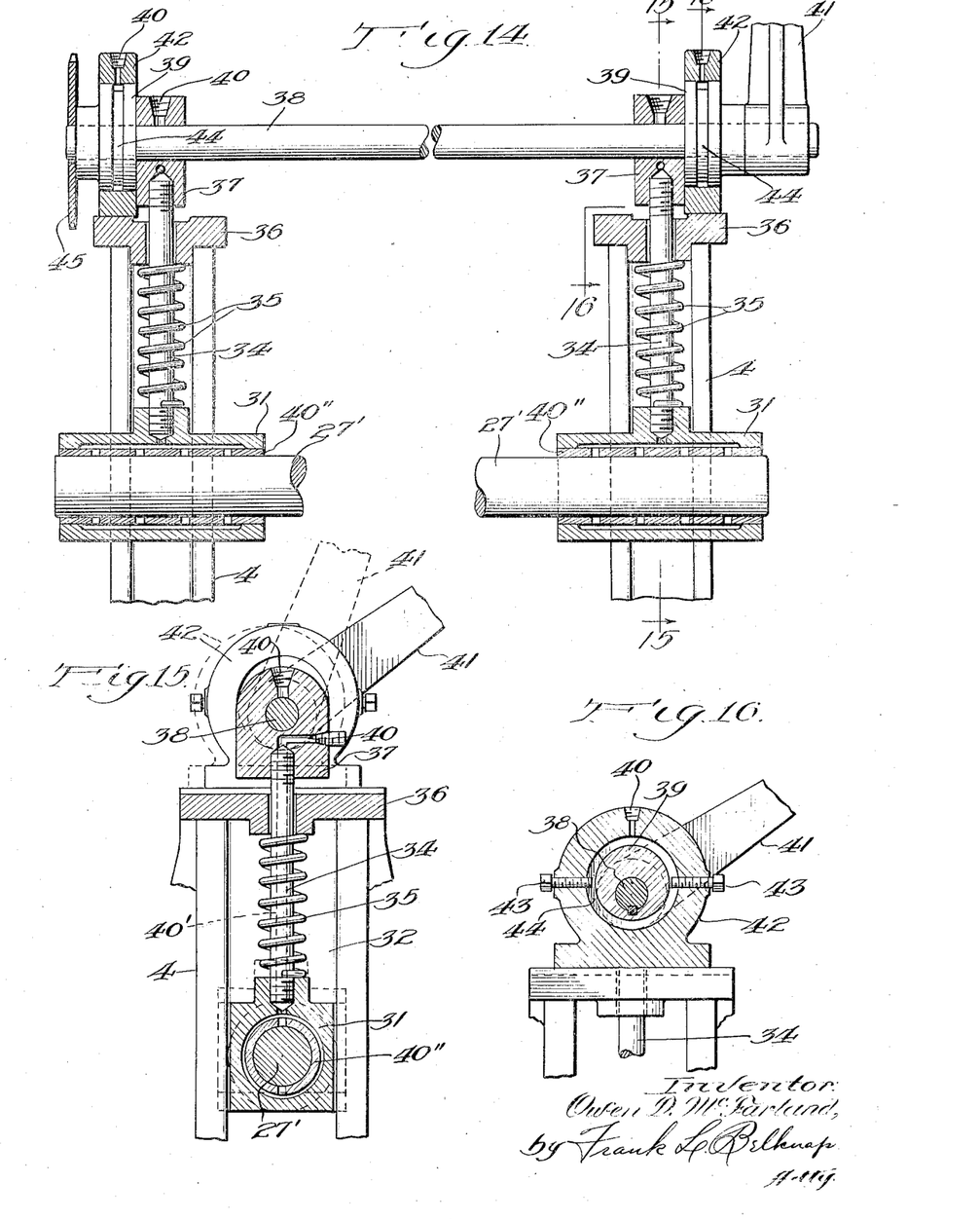
Fig. 14 is an enlarged fragmentary elevational view, partly in vertical section, illustrating the mechanism for raising or lowering the upper endless feed conveyor or the upper set of separating elements.
Fig. 15 is a cross-sectional view taken on line 15—15 of Fig. 14.
Fig. 16 is a cross-sectional view taken on line 16—16 of Fig. 14.

For the purpose of securing efficient oiling of all moving parts in the arrangement shown in Figs. 14, 15 and 16, I provide oil ducts 40 in the eccentric housing 42 and head 37, the latter communicating with an internal duct 40' (Fig. 15) which distributes the oil around bushing 40'', thus lubricating the shaft 27' through the ducts shown in the bushing.

The reason for the brackets 30 is to permit longitudinal horizontal adjustment of the endless feed conveyors, in order that any excess play may be taken up. This is accomplished in an obvious manner by the hand wheels 49 and screws 50 (Fig. 1).

The endless conveyors receive their drive as follows: The gear 11 is mounted on the shaft 28', which shaft 28' carries on each end sprockets 26' meshing with the chain 25 and transmitting drive to the opposite set of sprockets 26' carried by the shaft 28. Thus the drive of the lower endless feed conveyor 24 is positive. On this same shaft 28 a spur gear 51 (Fig. 2) is keyed, adapted to mesh with a similar gear (not shown) keyed on the end of the upper shaft 27'. This shaft 27' carrying sprockets 26 meshing with sprocket chains 25 will transmit the drive to the sprockets 26 mounted on each end of the shaft 27.

In order to simplify the description and eliminate unnecessary confusion, the auxiliary draw rolls 20 (Figs. 1 and 2), guide rolls 21 and edge slitting elements 22 have been merely referred to without any detailed description of their operation. They may or may not be used as part of the present invention, comprising usual standard parts of a roofing machine. The opposed endless feed conveyors 23 and 24 are shown in raised position in Fig. 1. It has been found that these endless feed conveyors of the present invention function perfectly to insure a positive and constant feed.

After leaving the endless feed conveyors, the sheet is fed to the design-forming means, the operation of which will now be described.

As a feature of the present invention, there is provided a movable carriage 52 (Figs. 3 and 4) having wheels 53 riding on tracks 54. This movable carriage 52 comprises opposite end housings 55 connected by means of cross braces 56. Each of the end housings 55 is provided with a vertical slot 57 (Fig. 6), acting as a slideway for the square bearings 58.

Figure 4:
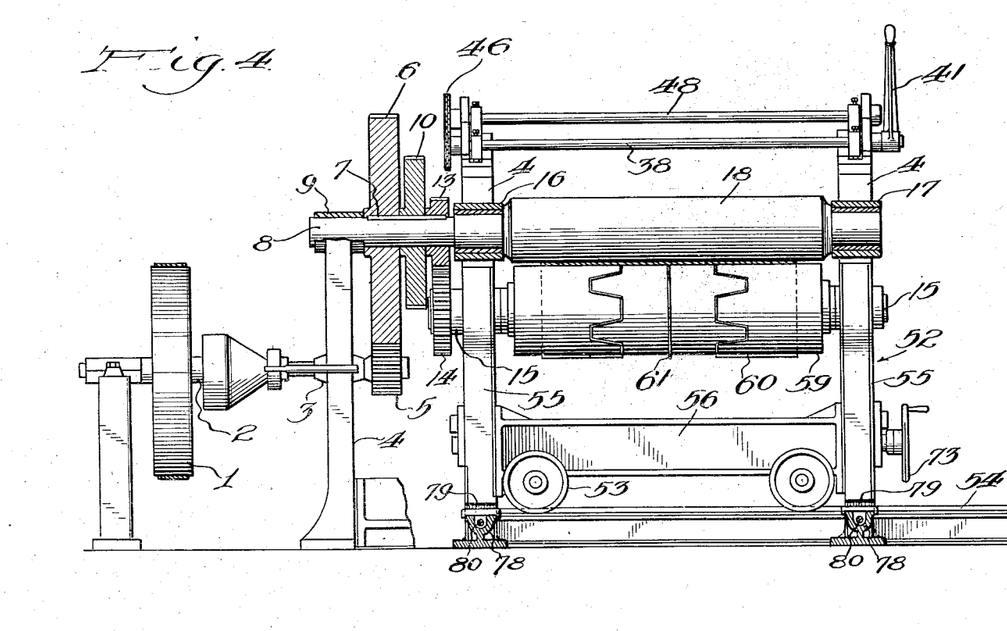
Fig. 4 is a cross-sectional view taken on line 4—4 of Fig. 1.

As another feature of the present invention, a cutting or design-forming cylinder designated 59, having on its surface design-cutting knives 60 and severing knives 61 mounted on shaft 15 journaled in the square bearings 58, is adapted to have removable engagement with the end housings 55. To the opposite end of the shaft 15 is keyed the gear 14, adapted to mesh with the gear 13 (Fig. 4).

Figure 3:
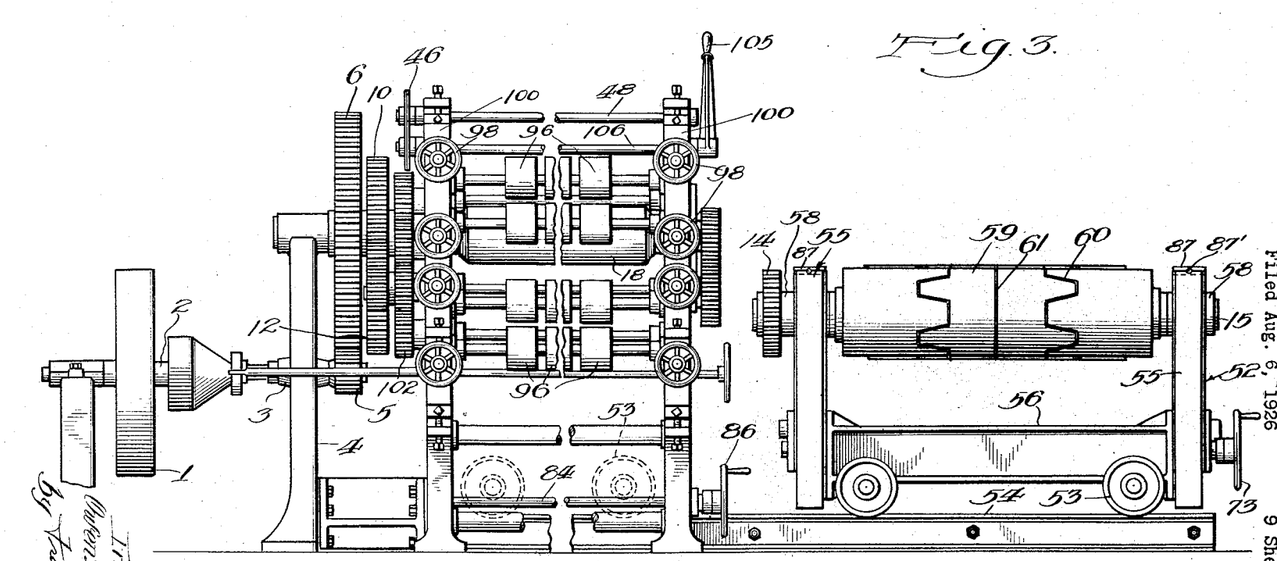
Fig. 3 is an end elevational view of the machine of the present invention.

The arrangement is such that the machine may be operated to produce individual shingle-simulating elements of any predetermined design and size. Assume for illustration that the machine has been operating to produce one design and size of individual shingle elements and it is desired to produce shingle elements of a different design and size. This is accomplished by moving the carriage 52 on the track 54 out of the machine, as shown in Fig. 3; cutting cylinder 59 is removed and another cutting cylinder having design-cutting knives 60 of different design and shape substituted therefor. The carriage 52 is then rolled back into the machine and into accurate and positive engagement, gear 14 being brought into mesh with gear 13, and cylinder 59 being brought into the proper contacting relation with the bed roll 18, as will now be described.

Before describing this means, it may be well to point out that it is, of course, obvious that the diameter of the roll and size of gear relative to gear 13 and bed roll 18 may be varied and predetermined for the individual shingle elements being produced.

It may be well to point out here that when the machine is placed in use, one carriage 52 is provided with each machine and also a number of cutting cylinders. These cutting cylinders comprise as a unit the shaft 15, square bearings 58, gear 48, cylinder knives 60 and severing knives 61, each cylinder with its gear being of a size predetermined to produce the individual shingle element of that design and size.

Describing now more particularly the means for causing the cylinder 59 and gear 14 to be properly adjusted relative bed roll 18 and gear 13 (Figs. 6, 7, 8 and 9), the lower surface of each square bearing 58 is adapted to contact a movable plate 62 provided with a hub 63. A threaded screw 64 is fixed to plate 62 by means of the pin 65 carried by the hub 63. The plate is adapted to have vertical sliding non-rotative contact with the sides of the carriage housing forming the slideway 57. The threaded screws 64, being fixed to the plate 62 as described, will also have a non-rotative vertical movement, this arrangement either raising or lowering the square bearing 58, thus raising or lowering shaft 15, cylinder 59 and gear 14. On its lower end the threaded screw 64 is provided with a worm gear 65, adapted to have meshing engagement with worm 66 carried by stub shaft 67 journaled in the housing bearings 68. Also mounted on the stub shaft 67 is a spur gear 69, adapted to have meshing engagement with another spur gear 70 disposed immediately therebelow, which latter is keyed to shaft 71. As will be seen by a reference to Fig. 7, the arrangement of threaded screws 64 and gearing is similar on each side of the machine. Keyed on the outer end of shaft 71 is a hand wheel hub 72 carrying the hand wheel 73.

As another feature of the present invention, I provide means for permitting adjustment of one end of shaft 15 relative to the other end. A pin 74 held under spring tension by coil spring 75 projects through the hub 72 into the slots 76 in the surface of sleeve 77. The sleeve 77 is keyed to the spur gear 70 which is closest to it, said gear and sleeve being loose on the shaft 71. The opposite spur gear 70, however, is keyed to the shaft 71. The thread screw 64 and gearing heretofore described which lies on the opposite side of the machine from the side on which the hand wheel 73 is mounted, is movable for the purpose of the adjustment now being described relative to the thread screw 64 and gearing on the side of the machine directly adjacent the hand wheel 73. This is accomplished by pulling out the pin 74 from engagement with one pinhole 76 and rotating the hand wheel 73 in either direction until the pin has been set in another of the spaced pinholes 76. This rotation of the hand wheel 73 will cause the shaft 71 which is keyed to its hub 72 to rotate, thus making the necessary adjustment by raising or lowering, as the case may be.

Figures 6, 8, 10:
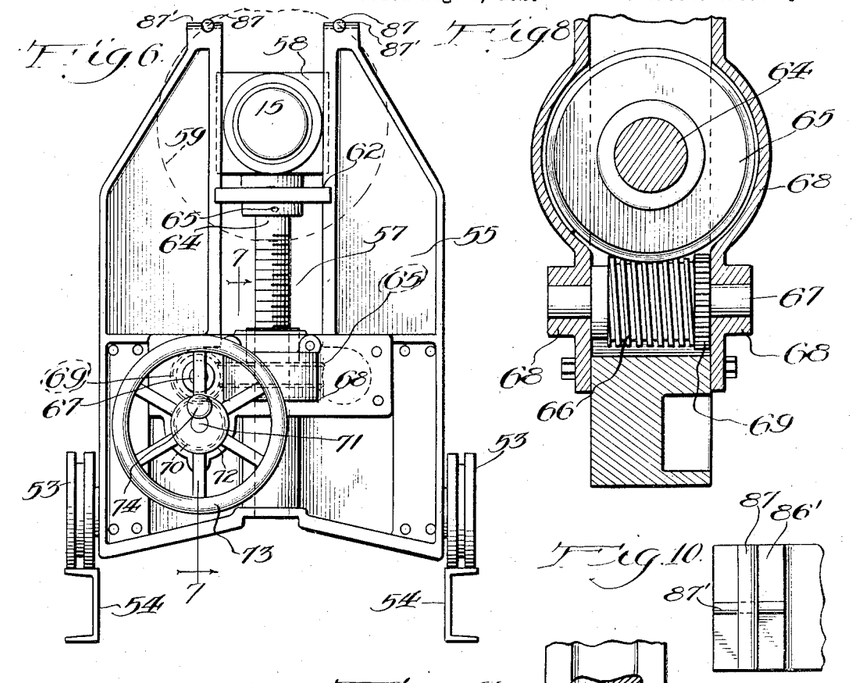
Fig. 6 is an enlarged side elevational view of the movable carriage.
Fig. 8 is a cross-sectional view taken on line 8—8 of Fig. 7.
Fig. 10 is a fragmentary top plan view of the locking pin arrangement on the top of the movable carriage housing.
Figures 7, 9:
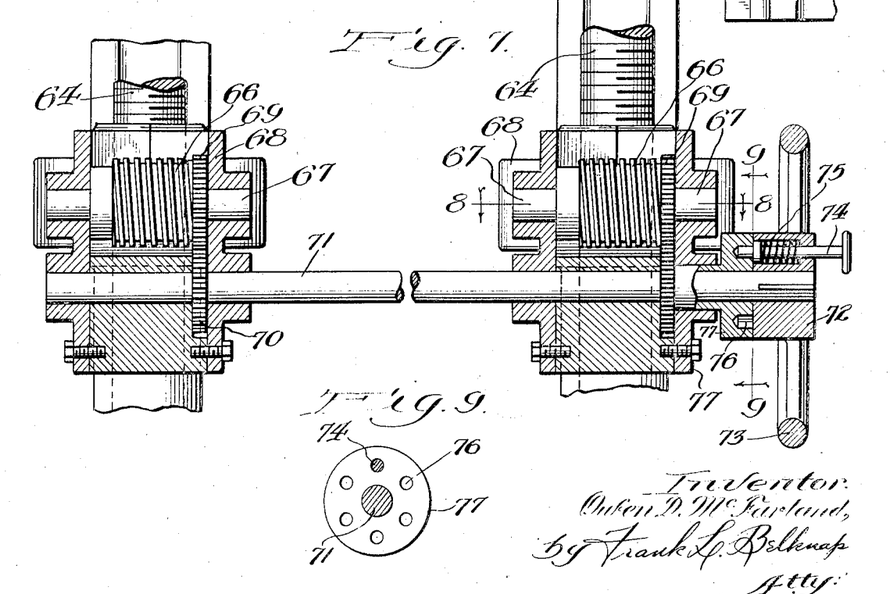
Fig. 7 is a cross-sectional view taken on line 7—7 of Fig. 6.
Fig. 9 is a cross-sectional view taken on line 9—9 of Fig. 7.

It may be well to point out here that the housing 68 encloses the entire mechanism shown in cross section in Fig. 7, as shown in Fig. 6, thus permitting the elements to move in a bath of lubricant and preventing dust and dirt from interfering with their operation.

Figure 11:
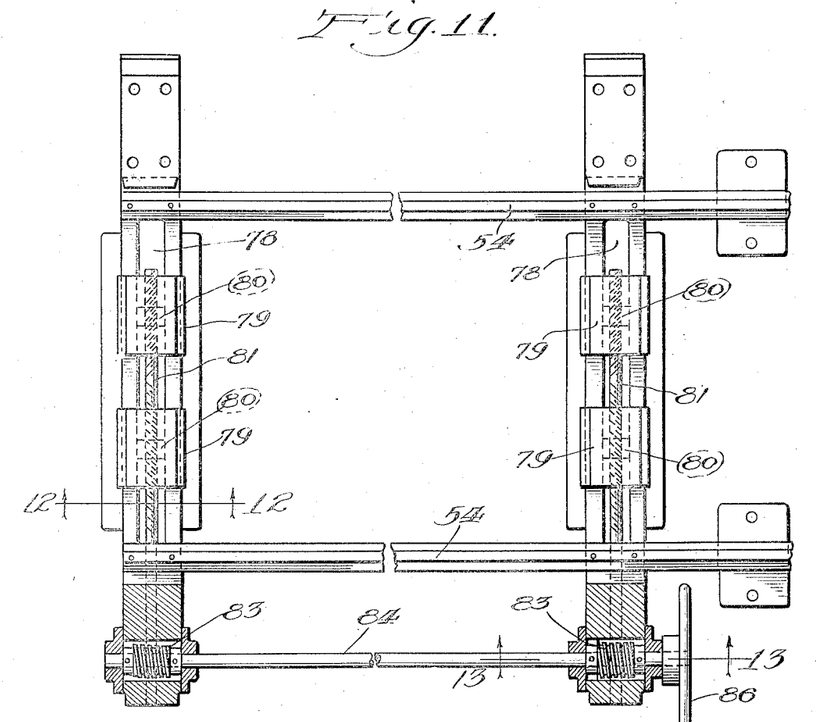
Fig. 11 is a top plan, partly in section, illustrating the mechanism for raising or lowering the movable carriage, and also illustrating the carriage track.
Figure 12:
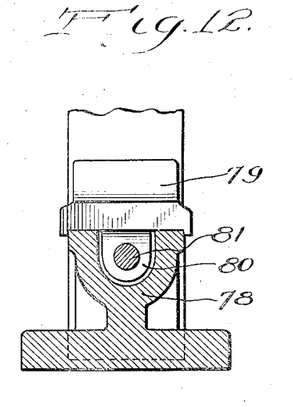
Fig. 12 is a cross-sectional view taken on line 12—12 of Fig. 11.
Figure 13:
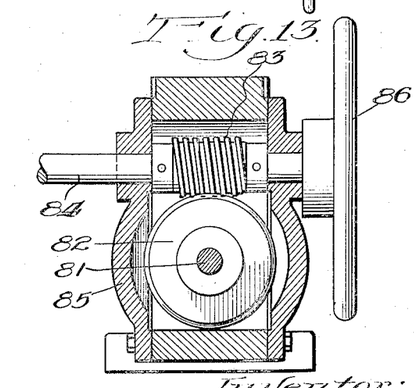
Fig. 13 is a cross-sectional view taken on line 13—13 of Fig. 11.

In addition to the mechanism above described for adjusting the cylinder 59 and gear 14, I have provided mechanism for raising or lowering the carriage 52. This latter mechanism comprises two oppositely disposed parallel internally slotted base supports 78 extending at right angles to the track 54, this support 78 comprising part of the main frame 4. Mounted for synchronized movement on each track 78 are a pair of spaced wedge blocks 79 having an internally screw-threaded downwardly projecting lug 80 extending in the slotted portion of the track 78. A right and left hand threaded screw 81 has engagement with each pair of oppositely disposed wedge blocks 79 through lugs 80 riding on the track 78. In other words, there are two of these screws 81, one on each side of the machine, registering with two wedge blocks 79 on each side. To one end of each screw 81 is keyed a worm gear 82, adapted to mesh with a worm 83 carried by the shaft 84. The worm gear 82 and worm 83 are enclosed within the housing 85. On the outer end of the shaft 84, a hand wheel 86 is keyed thereto. The arrangement is such that the shaft 84 extends from one side of the machine to the other, having the worms 83 near each end, meshing with worm gears 82 keyed to one end of each screw 81. This is clearly shown in Figs. 11, 12 and 13. As shown in Figs. 1 and 5, each set of spaced wedge blocks 79 taper downwardly from their inner sides, the lower edge of the carriage 52 tapering downwardly from its center in order to register therewith and making a tight sliding fit.

The operation of the mechanisms shown in Figs. 6, 7, 8, 11, 12 and 13 should be apparent. But it might be well to give here a brief description. Assume that a cutting cylinder 59 is in place in the machine, acting on a continuous strip of material, and assume that it is desired to change the design and size of the individual shingle element being produced. The hand wheel 86 is rotated in the proper direction to cause opposite wedge blocks to move toward each other, thus permitting the carriage 52 to be lowered on to the track 54. The lowering of the carriage 52 will also simultaneously lower shaft 15 carrying the cutting cylinder 59 and gear 14. The hand wheel 73 is then rotated to simultaneously disengage gear 14 from engagement with gear 13, by causing the shaft 15, with cylinder 59 and gear 14, to be lowered. When the cylinder 59 and gear 14 have been lowered sufficiently to disengage or clear, the carriage 52 is pulled out on the track 54 until the entire carriage is clear of the machine, as shown in Fig. 3. The cylinder which had been operating is removed, with its square bearing and gear 14, the cylinder 59, gear 14 and square bearing 58, together with shaft 15, being removed as a unit. Another cylinder 59 with its own square bearing 58 and its own gear 14 is substituted on the carriage, and the carriage wheeled back into the machine. The hand wheel 86 is then rotated to spread the opposite wedges 79 and raise the carriage with the shaft 15 as a unit until the top of the carriage 86' (Fig. 10), on which are mounted pins 87 and 87', is locked (Fig. 5.) These pins 87 and 87' registed with corresponding recesses in the lower surface of the bearing housing 17 on the main frame 4. The wheels 53 at that time are clear of track. However, it may be found that the cylinder 59 and gear 14 are not as yet high enough to engage properly with bed roll 18 and gear 13. If it is desired to raise one end of the shaft 15 relative to the other end, the pin 74 is manipulated as before described. When it is necessary to raise both ends of shaft 15 as a unit in order to bring the cylinder and gear into engagement, the hand wheel 73 is rotated to accomplish this purpose, as heretofore described. The substituted cutting cylinder is then ready to act upon the continuously advancing sheet to produce individual shingle elements of different design and size.

Figure 17:
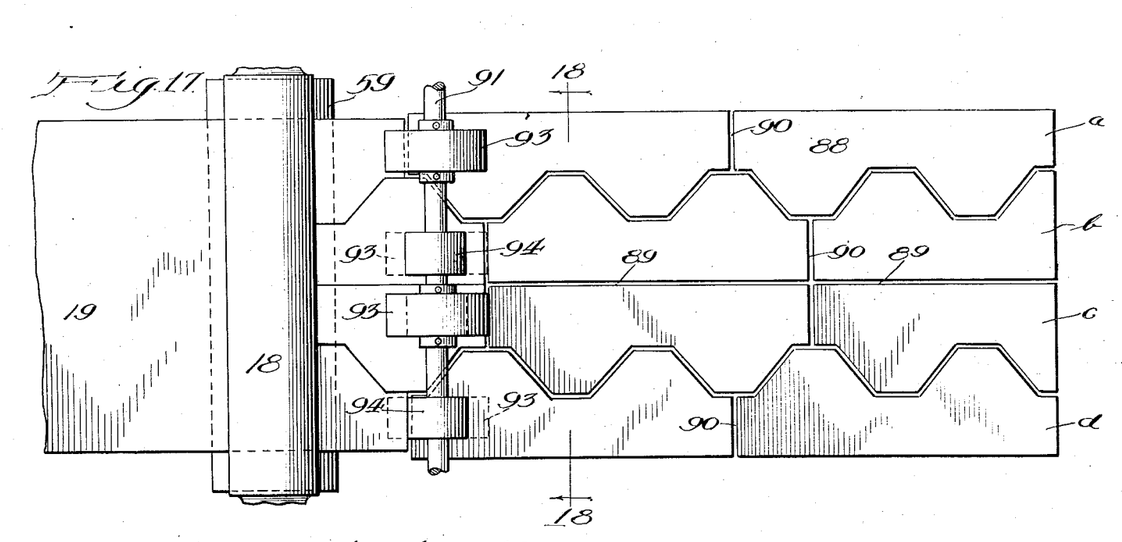
Fig. 17 is an enlarged fragmentary plan view illustrating the cutting head and separating elements.
Figure 18:
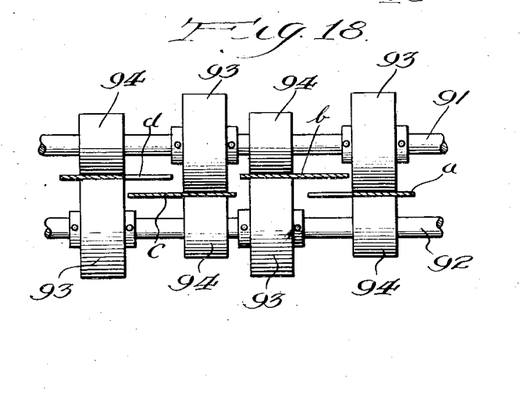
Fig. 18 is a cross-sectional view taken on line 18—18 of Fig. 17.
Figure 19:
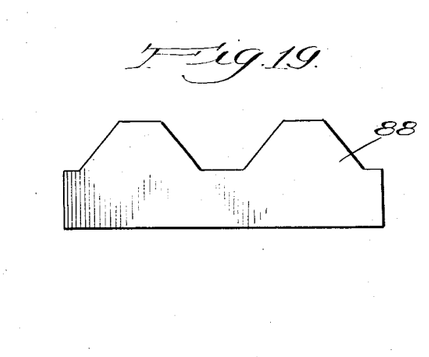
Fig. 19 is a plan view of an individual shingle-simulating element of one design and size known as the hexagon slab produced by the machine of the present invention.

Describing now the mechanism for separating the strip after leaving the cylinder 59, assume for the purpose of illustration that the cylinder 59 is forming a hexagon slab such as is illustrated diagrammatically at 88 (Figs. 17 and 18), severing a sheet 36 inches wide into four individual elements 88 designated a, b, c and d, the sheet being severed longitudinally on the line 89 and the individual elements 88 severed from each other along the transverse severing lines 90. It has been found in operation that some means must be provided for separating the individual elements 88 from each other regardless of the design of shingle being produced. To accomplish this purpose in an efficient and practical manner, I provide a pair of upper and lower shafts 91 and 92, journaled in bearings on both sides of the frame 4 of the machine. Loosely mounted on each shaft 91 and 92 are large spaced pulleys 93. Keyed on each shaft between and spaced from each large pulley 93 are smaller pulleys 94. The arrangement is such that a large pulley 93 mounted on one shaft is disposed opposite to a small pulley 94 mounted on the other shaft. By this arrangement, as the severed but disconnected elements leave the cutting cylinder 59, they pass between each set of pulleys, comprising one large pulley 93 and one small pulley 94, thus separating the individual elements 88 on different levels (Fig. 18).

Returning now to Fig. 5, each set of separating pulleys 93 and 94 feeds the element 88 either upwardly or downwardly, as the case may be, being guided by guides shown diagrammatically at 95, through sets of opposed conveyor belts shown diagrammatically at 96. These belts rotate around spaced pulleys 97 in an obvious manner. It is not thought necessary to describe these conveyor belts in detail, as they form no part of the present invention except in combination. As shown in Fig. 1, adjusting wheels 98, to which are attached adjusting screws 99 threaded in bearings carried by brackets 100, may be provided for adjusting the tension of the belts 96, taking up any play or slack therein. Pulleys 97 are mounted on shafts 101 (Figs. 1 and 5), on the outer end of which are mounted gears 102, adapted to have superposed meshing engagement with each other, one of said gears being adapted to be driven by meshing engagement with gear 12. The gear 12 is mounted on the shaft 92, which shaft also carries gear 103 adapted to mesh with gear 104 carried by shaft 91. The gears 103 and 104 impart drive to the shafts 91 and 92 on which the separating pulleys 93 and 94 are mounted.

A lever 105 is connected with an eccentric raising and lowering device mounted on shaft 106, similar to the eccentric raising and lowering device already described for raising and lowering the upper endless feed conveyor 23.

As a still further feature of the present invention, as one end of the individual shingle elements 88 passes between belts 96, these belts are gradually brought together until they reach the point denoted at X (Fig. 1), when the frictional pull is so strong on this end of the shingle element 88 that the balance of that element is forcibly pulled away in order to insure positive separation. The individual shingle elements capable of being produced in this machine will, of course, vary in length from maximum to minimum, and some means must be provided to adjust the friction at the point X to compensate for shingles of different length. To provide for this, the pulleys 107 bearing on the belts 96 to produce the friction at the point X are moved inwardly or outwardly, as the case requires. These pulleys are mounted on shafts 108, journaled in sliding bearing 109 having a sliding engagement with the main structure of the machine, said sliding engagement being regulated by the hand wheels 110 carrying screws 111.

Summing up briefly the operation of the machine, after a cylinder 59 of the proper design and size has been inserted and engaged by the permanent mechanism of the machine, the continuous sheet 19 is threaded through endless feed conveyors 23 and 24 between the cutting cylinder 59 and bed roll 18, where said cylinder 59 acts on the sheet. The cut sheet then passes to the separating pulleys, where the individual elements are separated, passing upwardly and downwardly between the belts 96. When they reach the point marked X, the pulling friction on the front end of each will pull the rear end away very positively. The separated individual elements are then collected in any suitable manner. The machine is efficient and positive in operation, requiring no adjustment whatsoever to the permanent mechanisms of the machine when a cutting cylinder of different design and size is substituted for one previously used. It is only necessary to keep a supply of cylinders on hand of the desired designs and sizes to be produced. The machine is exceedingly flexible in operation, permitting adjustment without interfering with its operation and also permitting the substitution of a cylinder of different design in a comparatively short time, for instance, from three to eight minutes.

It is understood, of course, that the mechanisms forming part of the permanent structure of the machine may be varied without departing from the scope of the present invention. It is also obvious that although I have illustrated a hexagon slab, the machine may produce any other design of shingle-simulating element, including those having cut-out portions.

I claim as my invention:

1. A machine for producing individual flexible shingle-simulating elements, comprising in combination a stationary main frame, means for feeding a continuous strip of flexible material into the machine, revolving means adapted to act on said continuously advancing sheet to produce slits and lines of severance therein according to a predetermined design, means for separating the continuous strip so slit and severed into individual elements, means for collecting the separated individual elements, said revolving means comprising a bed roll mounted for rotary movement on a shaft bearing in the main frame, and an opposed design-forming cutting cylinder mounted for rotary movement on a shaft bearing in a movable frame, opposed gears carried by each of said shafts, and means for moving the movable frame into and out of the machine.

2. A machine for producing individual flexible shingle-simulating elements, comprising in combination a stationary main frame, means for feeding a continuous strip of flexible material into the machine, revolving means adapted to act on said continuously advancing sheet to produce slits and lines of severance therein according to a predetermined design, means for separating the continuous strip so slit and severed into individual elements, means for collecting the separated individual elements, said revolving means comprising a bed roll mounted for rotary movement on a shaft bearing in the main frame, an opposed design-forming cutting cylinder mounted for rotary movement on a shaft bearing in a movable frame, opposed gears carried by each of said shafts, means for moving the movable frame into and out of the machine, and means carried by said movable frame for adjusting the engagement between the design-forming cutting cylinder, the bed roll and said gears, comprising means for raising or lowering the cylinder and cylinder shaft.

3. A machine for producing individual flexible shingle-simulating elements, comprising in combination a stationary main frame, means for feeding a continuous strip of flexible material into the machine, revolving means adapted to act on said continuously advancing sheet to produce slits and lines of severance therein according to a predetermined design, means for separating the continuous strip so slit and severed into individual elements, said revolving means comprising a bed roll mounted for rotary movement on a shaft bearing in the main frame, an opposed design-forming cutting cylinder mounted for rotary movement on a shaft bearing in a movable frame, opposed gears carried by each of said shafts, means for moving the movable frame into and out of the machine, and means mounted in the main frame for raising or lowering the carriage and cylinder as a unit when said carriage is in the machine.

4. A machine for producing individual flexible shingle-simulating elements, comprising in combination a stationary main frame, means for feeding a continuous strip of flexible material into the machine, revolving means adapted to act on said continuously advancing sheet, to produce slits and lines of severance therein according to a predetermined design, means for separating the continuous strip so slit and severed into individual elements, means for collecting the separated individual elements, said revolving means comprising a bed roll mounted for rotary movement on a shaft bearing in the main frame, and an opposed design-forming cutting cylinder mounted for rotary movement on a shaft bearing in a movable frame, opposed gears carried by each of said shafts, means for moving the movable frame into and out of the machine, means carried by said movable frame for adjusting the engagement between the design-forming cutting cylinder, the bed roll and said gears, comprising means for raising or lowering the cylinder and cylinder shaft, and means mounted in the main frame for raising or lowering the movable frame and cylinder as a unit when said frame is in the machine.

5. A machine for producing individual flexible shingle-simulating elements, comprising in combination a stationary main frame, means for feeding a continuous strip of flexible material into the machine, revolving means adapted to act on said continuously advancing sheet to produce slits and lines of severance therein according to a predetermined design, means for separating the continuous strip so slit and severed into individual elements, said revolving means comprisng a design-forming cutting cylinder mounted on a movable carriage adapted to have removable engagement with the machine, said strip feeding means comprising opposed endless feed conveyors frictionally engaging both surfaces of said strip as the latter passes therethrough to insure positive forward feed.

6. A machine for producing individual flexible shingle-simulating elements, comprising in combination a stationary main frame, means for feeding a continuous strip of flexible material into the machine, revolving means adapted to act on said continuously advancing sheet to produce slits and lines of severance therein according to a predetermined design, means for separating the continuous strip so slit and severed into individual elements, means for collecting the separated individual elements, said revolving means comprising a design-forming cutting cylinder mounted on a movable carriage adapted to have removable engagemeant with the machine, said strip feeding means comprising opposed endless feed conveyors frictionally engaging both surfaces of said strip as the latter passes therethrough, to insure positive forward feed, and means for raising the upper endless conveyor of a set to permit the initial threading of the strip therebetween.

7. A machine for producing individual flexible shringle-simulatiing elements, comprising in combination a stationary main frame, means for feeding a continuous strip of flexible material into the machine, revolving means adapted to act on said continuously advancing sheet to produce slits and lines of severance therein according to a predetermined design, means for separating the continuous strip so slit and severed into individual elements, and means for collecting the separated individual elements, said revolving means comprising a design-forming cutting cylinder mounted on a movable carriage adapted to have removable engagement with the machine, said separating means comprising transversely spaced pulleys of different diameters, mounted on upper and lower shafts and so arranged that a pulley of smaller diameter on one shaft is opposite to a pulley of larger diameter on another shaft, thus comprising a set through which the strips being separated pass.

8. A machine for producing individual flexible shingle-simulating elements, comprising in combination a stationary main frame, means for feeding a continuous strip of flexible material into the machine, revolving means adapted to act on said continuously advancing sheet to produce slits and lines of severance therein according to a predetermined design, means for separating the continuous strip so slit and severed into individual elements, means for collecting the separated individual elements, said revolving means comprising a design-forming cutting cylinder mounted on a movable carriage adapted to have removable engagement with the machine, and means for conveying the separated elements from the separating means to the collecting means, comprising opposed endless conveyors adapted to frictionally engage the forward portion of each element to assist in the separating action by the frictional pull exerted thereby.

9. A machine for producing individual flexible shingle-simulating elements, comprising in combination a stationary main frame, means for feeding a continuous strip of flexible material into the machine, revolving means adapted to act on said continuously advancing sheet to produce slits and lines of severance therein according to a predetermined design, means for separating the continuous strip so slit and severed into individual elements, means for collecting the separated individual elements, said revolving means comprising a design-forming cutting cylinder mounted on a movable carriage adapted to have removable engagement with the machine, means for conveying the separated elements from the separating means to the collecting means, comprising opposed endless conveyors adapted to frictionally engage the forward portion of each element to assist in the separating action by the frictional pull exerted thereby, and means for adjusting the relative tension between each set of opposed endless conveyors.

OWEN D. McFARLAND.